(12) United States Patent
Dave et al.

(10) Patent No.: US 9,339,747 B2
(45) Date of Patent: May 17, 2016

(54) CARBON BLOCK FILTER

(75) Inventors: Parthiv Ripudaman Dave, Mumbai (IN); Debasis Mukherjee, Mumbai (IN); Madalasa Srivastava, Mumbai (IN)

(73) Assignee: Conopco, Inc., Englewood Cliffs, NJ (US)

( * ) Notice: Subject to any disclaimer, the term of this patent is extended or adjusted under 35 U.S.C. 154(b) by 701 days.

(21) Appl. No.: 13/124,130

(22) PCT Filed: Sep. 21, 2009

(86) PCT No.: PCT/EP2009/062183
§ 371 (c)(1),
(2), (4) Date: May 10, 2011

(87) PCT Pub. No.: WO2010/043472
PCT Pub. Date: Apr. 22, 2010

(65) Prior Publication Data
US 2011/0203991 A1   Aug. 25, 2011

(30) Foreign Application Priority Data
Oct. 17, 2008 (IN) .......................... 2233/MUM/2008

(51) Int. Cl.
*B01D 39/16* (2006.01)
*B29C 67/20* (2006.01)
*B01D 39/20* (2006.01)

(52) U.S. Cl.
CPC .... *B01D 39/2062* (2013.01); *B01D 2239/0442* (2013.01); *B01D 2239/0464* (2013.01); *B01D 2239/086* (2013.01); *B01D 2239/10* (2013.01); *B01D 2239/1291* (2013.01)

(58) Field of Classification Search
USPC .......... 131/334, 342; 210/263, 266, 282, 506, 210/660, 732; 264/42; 427/215
See application file for complete search history.

(56) References Cited

U.S. PATENT DOCUMENTS

| | | | |
|---|---|---|---|
| 2,847,332 A | 8/1958 | Ramadanoff | |
| 3,355,317 A | 11/1967 | Keith et al. | |
| 4,529,623 A | 7/1985 | Maggs | |
| 4,753,728 A | 6/1988 | Vanderbilt et al. | |
| 6,368,504 B1 | 4/2002 | Kuennen | |
| 2001/0042719 A1 | 11/2001 | Levy | |
| 2003/0097933 A1* | 5/2003 | Choudary et al. | 95/143 |
| 2004/0168972 A1 | 9/2004 | Hughes et al. | |
| 2004/0251190 A1* | 12/2004 | Cumberland | 210/266 |
| 2005/0004299 A1 | 1/2005 | Haftka et al. | |
| 2005/0211635 A1 | 9/2005 | Yeh et al. | |
| 2006/0000763 A1 | 1/2006 | Rinker et al. | |
| 2007/0295346 A1 | 12/2007 | McCormack et al. | |
| 2008/0254980 A1 | 10/2008 | Wu et al. | |

FOREIGN PATENT DOCUMENTS

| | | |
|---|---|---|
| CA | 2396510 A1 | 2/2003 |
| CN | 1052653 | 7/1991 |
| CN | 1394147 A | 1/2003 |
| DE | 3229340 A1 | 2/1984 |
| EP | 1108359 A1 | 6/2001 |
| EP | 2177252 A1 | 4/2010 |
| JP | 2000263040 A | 9/2000 |
| JP | 2002525400 A | 8/2002 |
| JP | 2003263040 A | 9/2003 |
| JP | 2007512956 A | 5/2007 |
| WO | WO0018810 | 4/2000 |
| WO | WO03064330 A1 | 8/2003 |
| WO | WO2005056151 A2 | 6/2005 |
| WO | WO2005094966 A1 | 10/2005 |
| WO | 2007/003383 A1 | 1/2007 |

OTHER PUBLICATIONS

Calgon Carbon Corporation, TOG-NDS 20×50, 2008 http://www.calgoncarbon.com/carbon_products/water.html.
Cameron Carbon Inc., SG6-AG, 2006, http://www.cameroncarbon.com/pdfs/SG6-AG.pdf.
Cameron Carbon Inc., Chemically Impregnated Carbons, 2004, pp. 1-2, http://www.web.archive.org/web/20041211210402/http://www.cameroncarbon.com/chemcarb.htm.
Equistar Chemicals LP, "Microthene F FN510-00", 2004, http://www.equistarchem.com/html/polymer/performance_polymers/MicrotheneF.html.
Mola et al., The Characterisation and evaluation of activated carbon in a cigarette filter, Adsorption, 2008, pp. 335-341, vol. 14.
Notice of Opposition and Grounds of Opposition, Briata GmbH/Unilever N.V. (EP2177252), (2013).
International Search report in PCT Application PCT/EP2009/062183, dated Dec. 4, 2009.
European Search report in EP 08 17 1305, dated Mar. 24, 2009.
European Search report in EP 09 17 1296, dated Feb. 23, 2010.
Written Opinion in PCT Application PCT/EP2009/062183.
*International Search Report*, PCT/EP2009/062183, mailed Dec. 4, 2009. 3 pp.

* cited by examiner

*Primary Examiner* — Dirk Bass
(74) *Attorney, Agent, or Firm* — Greenberg Traurig, LLP

(57) ABSTRACT

The present invention relates to a process for making metal impregnated bound Carbon block filters. In particular the present invention to a process for preparing a moulded Carbon block filter impregnated with a metal selected from Silver, Copper or Zinc, with relatively low level of variation in metal content across the blocks, relatively lower deviation from the theoretical metal content, and where the leach-rate of metal from the block during use is relatively low.

7 Claims, No Drawings

CARBON BLOCK FILTER

TECHNICAL FIELD

The present invention relates to a process for making metal impregnated bound Carbon block filters.

The invention has been developed primarily for use in gravity-fed water filtration devices for purification of drinking water, and will be described hereinafter with reference to this application. However, it will be appreciated that the invention is not limited to this particular field of use.

BACKGROUND AND RELATED ART

Any discussion of the prior art throughout the specification should in no way be considered as an admission that such prior art is widely known or forms part of the common general knowledge in the field.

Drinking water contains different contaminants such as particulate matter, harmful chemicals, bacteria, cysts and viruses. It is recommended by health professionals that such contaminants should be removed so that water becomes fit for consumption.

Activated Carbon is useful for the purification of drinking water as it aids in the removal of chemical contaminants, cysts, particulate matter and bacteria. However, activated Carbon particles have rough and porous texture which is capable of providing a favorable and protected surface for bacterial growth. As a result, algae and bacteria colonize the Carbon surface, thus diminishing the surface available to contact the water as well as allowing these organisms to grow. Even if the water is chlorinated, some bacteria are chlorine resistant. Thus, the activated Carbon actually can promote the growth of bacteria that would not grow in the chlorinated water per-se. The most predominant bacteria that were isolated from such water belonged to the genus *Pseudomonas*. In addition, bacteria of the genus *Bacillus* were also found in large quantities.

A method of making bound Carbon block filters for use in water purification has been described in U.S. Pat. No. 4,753,728 (Amway, 1988) in which Carbon particles are bonded into a filter block by a polymeric material having melt index of less than 1 gram per 10 minutes as determined by ASTM (American Society for Testing and Materials) D1238 standard, at 190° C., and 15 kg load.

CA2396510 (TYK Corp, 2003) describes a process for preparing Carbon filters using particles of size 35-200μ with 50% or more ceramic binder, in which water is sprayed onto this mixture before it is sintered.

To prevent and/or reduce the occurrence of bacterial colonization on the surface of the Carbon block, such blocks are generally impregnated with a metal such as Silver, Copper or Zinc.

U.S. Pat. No. 2,847,332 (Union Carbide Corporation, 1958) describes a process for impregnating metallic Silver onto a bound Carbon block in which a bound block is dipped into an aqueous solution of Silver nitrate and the Silver ions are precipitated as an insoluble Silver compound by exposing the dipped block to Ammonia fumes to precipitate Silver oxide. This is followed by reduction of the Silver oxide to metallic Silver by heat treatment. It is said that the process results in impregnated blocks with a uniform distribution of Silver content. This process is suitable for impregnation of higher levels of metals, but the present inventors have found that that blocks made in accordance with this process show variation in the amount of the impregnated metal across different blocks. This variation could become critical when the level of impregnation sought is lower.

US2006000763 (The Clorox Company, 2006), discloses a gravity flow carbon block filter comprising approximately 20-90 wt % activated carbon particles having a mean particle size in the range of approximately 90-220 mu·m, and approximately 10-50 wt % low melt index polymeric material. The low melt index polymeric material can have a melt index less than 1.0 g/10 min or greater than 1.0 g/10 min and a mean particle size in the range of approximately 20-150 mu·m.

U.S. Pat. No. 3,355,317 (Keith et. al., 1967), discloses impregnation of gas adsorbent materials with metal oxides for use in cigarette filters.

On the other hand, in the prior art process, there are two separate steps for block making; a metal impregnation step; and a block making step. The first process is generally done by the suppliers of activated Carbon particles. The two processes are independent of each other and therefore the cost of Carbon block manufacturers increases because the metal impregnated Carbon comes at a cost to the person making the blocks.

The present inventors have found that the above procedure is cumbersome as it is a two-step process. Further, this procedure is not suitable for impregnating lower levels of Silver or other metals, of the order of 0.01 to 5.0 wt %, while still showing relatively low level of variation in metal content across different blocks.

OBJECT OF THE INVENTION

It is an object of the present invention to overcome or ameliorate at least one of the disadvantages of the prior art.

It is an object of the present invention to provide a process for preparing a moulded Carbon block filter impregnated with a metal selected from Silver, Copper or Zinc, with relatively low level of variation in metal content across the blocks, relatively lower deviation from the theoretical metal content, and where the leach-rate of metal from the block during use is relatively low.

Other objects of the present invention will become apparent to those skilled in the art by reference to the specification.

The present inventors have surprisingly found that bound Carbon block filters with relatively low level of variation in metal content across the blocks, relatively lower deviation from the theoretical metal content, and relatively lower leach-rate of metal from the blocks during use could be obtained by a process in which the activated Carbon particles are contacted with an aqueous solution of a salt of the metal in the presence of Ammonium hydroxide, followed by the addition of a polymeric binder and finally moulding the block by application of pressure and heat.

Uniform metal impregnation happens during the process of molding by heat and pressure. The inventors have also observed that this process offers high cost savings due to reduction in energy consumption. It was also observed that surprisingly the impregnated blocks made by the process according to the invention, showed relatively higher absorption of organic contaminants when compared with the conventional metal impregnated Carbon blocks.

SUMMARY OF THE INVENTION

According to the first aspect of the invention there is provided a process for making metal a impregnated Carbon block filter comprising the steps of:

contacting activated Carbon particles with an aqueous solution of a salt of Silver, Zinc or Copper in the presence of Ammonium hydroxide, to form an aqueous mix;

mixing said aqueous mix with a binder having Melt Flow Rate less than 5 g/10 minutes to form a mixture;

adding said mixture to a mould;

heating said mould to a temperature in the range of 150 to 350° C.; and, de-moulding the Carbon block filter.

It is preferred that the activated Carbon particles are contacted with an aqueous solution of Silver nitrate, Zinc nitrate or Copper nitrate.

It is particularly preferred that the activated Carbon particles are contacted with an aqueous solution of Silver nitrate.

Preferably the concentration of Silver nitrate in the aqueous solution is in the range of 0.01 to 10%.

It is also preferred that the mixture in the mould is compressed before heating the mould.

According to the second aspect of the invention there is provided a metal impregnated Carbon block filter obtainable by the process according to the first aspect.

The term "comprising" is meant not to be limiting to any subsequently stated elements but rather to encompass non-specified elements of major or minor functional importance. In other words the listed steps, elements or options need not be exhaustive. Whenever the words "including" or "having" are used, these terms are meant to be equivalent to "comprising" as defined above.

Except in the operating and comparative examples, or where otherwise explicitly indicated, all numbers in this description indicating amounts of material ought to be understood as modified by the word "about".

It should be noted that in specifying any range of concentration or amount, any particular upper concentration can be associated with any particular lower concentration or amount.

For a more complete understanding of the above and other features and advantages of the invention, reference should be made to the following detailed description of preferred embodiments.

DETAILED DESCRIPTION

The expression wt % used throughout the specification means percentage by weight.

Activated Carbon particles are preferably selected from one or more of bituminous coal, coconut shell, and wood and petroleum tar. It is preferred that surface area of the activated Carbon particles exceeds 500 $m^2/g$, more preferably exceeds 1000 $m^2/g$. It is preferred that size uniformity co-efficient of the activated Carbon particles is less than 2, more preferably less than 1.5. It is preferred that Carbon Tetrachloride ($CCl_4$) number of the activated Carbon particles exceeds 50%, more preferably exceeds 60%. Preferably Iodine number of the activated Carbon particles is greater than 800, more preferably greater than 1000. It is preferred that not more than 5% of the activated Carbon particles pass through a sieve of 150 mesh, and not more than 5% particles are retained on a sieve of 12 mesh. It is further preferred that not more than 5% by weight of the activated Carbon particles pass through a sieve of 75 mesh and not more than 5% by weight is retained on a sieve of 30 mesh. It is particularly preferred that less than 1% activated Carbon particles pass through a sieve of 200 mesh.

The Melt Flow Rate (MFR) of the binder is less than 5 g/10 minutes, preferably less than 2 g/10 minutes, and more preferably less then 1 g/10 minutes. Bulk density of the binder is preferably less than or equal to 0.6 $g/cm^3$, more preferably less than or equal to 0.5 $g/cm^3$, and most preferably less than or equal to 0.25 $g/cm^3$. Preferred binder is selected from Ultra High Molecular Weight Polyethylene or Ultra High Molecular Weight Polypropylene, which have these low MFR values. Their molecular weight is preferably in the range of $10^6$ Daltons to $10^9$ Daltons. Binders of this class are commercially available under the trade names HOSTALEN™ from Tycona GMBH, GUR, SUNFINE™ (from Asahi, Japan), HIZEX™ (from Mitsubishi) and from Brasken Corp (Brazil). Other suitable binders include LDPE sold as LUPOLEN™ (from Basel Polyolefins) and LLDPE from Qunos (Australia).

The melt-flow rate of the binder is measured using ASTM D 1238 (ISO(International Organization for Standardization) 1133) test. This test measures the flow of a molten polymer through an extrusion plastometer under specific temperature and load conditions. The extrusion plastometer consists of a vertical cylinder with a small die of 2 mm at the bottom and a removable piston at the top.

A charge of material is placed in the cylinder and preheated for several minutes. The piston is placed on top of the molten polymer and its weight forces the polymer through the die and on to a collecting plate. The temperature for testing the present polymeric binder material could be chosen at 190° C. and the load at 15 kg. The amount of polymer collected after a specific time interval is weighed and normalized to the number of grams that would have been extruded in 10 minutes; melt flow rate is thus expressed in grams per 10 minutes.

It is preferred that the ratio of the activated Carbon particles to the binder is from 2:1 to 10:1 parts by weight, more preferably from 2:1 and 8:1 parts by weight.

The activated Carbon particles are contacted with an aqueous solution of a salt of Silver, Zinc or Copper in the presence of Ammonium hydroxide, to form an aqueous mix. It is preferred that the activated Carbon particles are contacted with an aqueous solution of Silver nitrate, although it is also possible to use other Silver salts such as Silver chloride or Silver iodide. Preferably the concentration of Silver nitrate in the aqueous solution is in the range of 0.01 to 10 wt %, more preferably 0.02 to 5 wt % and most preferably 0.02 to 3 wt %. In the case of Silver impregnation, the level of impregnation of Silver in the activated Carbon particles is preferably in the range of 0.01 to 5 wt %, more preferably in the range of 0.02 to 2 wt %, and most preferably in the range of 0.05 to 1 wt %. It is particularly preferred that the level of Silver impregnation is 1 wt %. It is also possible to impregnate Zinc, Copper, a mixture of Silver and Copper, mixture of Silver and Zinc, mixture of Copper and Zinc, or a mixture of Silver, Copper and Zinc by appropriate selection of the salts.

The preferred ratio of Ammonium hydroxide to the salt of Silver is in the range of 1:2 to 1:10, more preferably in the range of 1:3 to 1:5, and most preferably in the range of 1:2 to 1:3.

In the case of Copper and Zinc, the level of impregnation is preferably in the range of 0.01 to 10 wt %, more preferably in the range of 0.01 to 5 wt % and most preferably in the range of 0.01 to 2 wt %. The preferred ratio of Ammonium hydroxide to the salt of Copper is in the range of 1:0.05 to 1:2, more preferably in the range of 1:0.1 to 1:1, and most preferably in the range of 1:0.1 to 1:0.7. In the case of salt of Zinc, the preferred ratio of Ammonium hydroxide to the salt is in the range of 1:0.2 to 1:5, more preferably in the range of 1:0.4 to 1:3, and most preferably in the range of 1:0.5 to 1:1.5. Apart from the nitrate salt, it is also possible to use other Copper/Zinc salts, such as chloride or iodide.

It is preferred that the concentration of Ammonium hydroxide in water is in the range of 0.1 to 10 wt % and preferably in the range of 0.1 to 5 wt %.

It is preferred that the ratio of the activated Carbon particles to the aqueous solution of the salt of Silver, Zinc or Copper is in the range of 1:0.4 to 1.1.2 and more preferably in the range of 1:0.4 to 1:1.

The activated Carbon particles are mixed with an aqueous solution of the salt of Silver, Zinc or Copper in the presence of Ammonium hydroxide, to obtain an aqueous mix. The mixing is preferably done in vessels which include an agitator, mixer with dulled impeller blades, ribbon blender, rotary mixer or any other low shear mixer that does not significantly alter the particle size distribution. The mixing is carried out to prepare a uniform mix of the Carbon particles. The binder is then added to the above aqueous mix and is further mixed to obtain a mixture. Mixing is preferably carried out for at least 5 minutes, more preferably from 5 to 10 minutes. This mixture is optionally vibrated for a short period, e.g. for 3 to 10 minutes to compact the mixture before moulding. The vibratory compaction is preferably carried out in a vibrator having frequency in the range of 30 to 100 Hz. This process step is preferably carried out for a period of at least one minute, more preferably for 3 to 10 minutes. The mass, whether or not compacted by vibration, is then placed in a mould of pre-selected size and shape and is compressed with pressure not more than 20 kg/cm$^2$, preferably from 3 to 15 kg/cm$^2$ and most preferably from 4 to 10 kg/cm$^2$. The pressure is preferably applied using either a hydraulic press or a pneumatic press, more preferably a hydraulic press. The mould is preferably made of Aluminium, cast iron, steel or any material capable of withstanding temperatures exceeding 400° C. The mould is heated to 150 to 350° C., preferably in the range of 200 to 300° C. The mould is kept heated for more than 60 minutes, preferably from 90 to 300 minutes. The mould is preferably heated in a non-convection, forced air or forced inert-gas convection oven. The mould is then cooled and the moulded filter is released from the mould.

Preferably, a mould release agent is coated on the inside surface of the mould. The mould release agent is preferably selected from Silicone oil, Aluminium foil, or the mould can be coated with suitable materials like Teflon or any other commercially available mould release agent that has little or no adsorption onto the filter medium.

Further details of the invention, its objects and advantages are explained hereunder in greater details with reference to the following non-limiting examples. It would be apparent to a person skilled in the art that many such examples are possible and the examples given under are for illustrative purpose only. These should not be construed so as to limit the scope of this invention in any manner.

EXAMPLES

Example-1

Process for Making Silver Impregnated Carbon Block Filters

A Silver impregnated activated Carbon block filter according to the invention was prepared by using 30 kg activated Carbon particles (particle size in the range of 500μ to 1400μ) supplied by Active Carbon (India). The activated Carbon particles were contacted with 20 liters of an aqueous solution of 0.3 wt % Silver nitrate. Ammonium hydroxide was then added to this solution so that its concentration in the solution was 0.1 wt %. The ratio of the concentration of Ammonium hydroxide to that of Silver nitrate was 1:3. This aqueous solution was transferred to a ribbon blender at ambient temperature and mixed under 40 RPM (revolutions per minute) and the activated Carbon particles were added. The activated Carbon particles and the above aqueous solution were mixed for about 5 minutes to obtain an aqueous mix. To this aqueous mix, 4.9 kg of Ultra High Molecular Weight Polyethylene with MFR~0 g/10 minutes, and having bulk density of 0.45 g/cm$^3$ from Asahi Corporation (Japan) were added under mixing, to form a mixture. The above ingredients were mixed for another 5 minutes. The mixture was then removed and about 600 g of this mixture was added to a mould. The mixture was compacted in the mould using hydraulic press to a pressure of 5 kg/cm$^2$ and cured in a hot air oven at 250° C. for about 150 minutes. The hot moulds containing the Carbon blocks were cooled for at least 30 minutes and then de-moulded. The theoretical Silver content was 0.1 wt %.

In a similar manner, a comparative Carbon block filter made from commercially available Silver impregnated activated Carbon particles (i.e. pre-impregnated activated Carbon particles) with identical properties as in Example-1, (purchased from Active Carbon (India)) having 0.1 wt % Silver was made. In this comparative filter block, the procured activated Carbon particles were already impregnated with Silver metal and then the particles were made into a block using Ultra High Molecular Weight Polyethylene binder, pressure and heat, as done above. The amount of the binder and the process parameters were kept the same as above. Commercial Silver impregnated activated Carbon particles which are available from suppliers of activated Carbon particles are generally made by impregnating the particles in an aqueous solution of soluble Silver salts, and subsequently drying in an oven at 110-120° C. for very long period of time typically, 15 to 16 hours).

Example-2

Analysis of Silver Content of the Carbon Block Filter Made in Example-1 v/s Comparative Silver Impregnated Carbon Block Filters The Silver content of the Carbon block filter made in Example-1 was estimated by a well known procedure which involved extraction with Perchloric acid followed by Atomic Adsorption Spectroscopy (AAS) measurement, according to EPA (Environmental Protection Agency of USA) ref no 200.9. The theoretical Silver content in the Carbon block of Example-1 was 0.1 wt %. This was compared against the average Silver content of the comparative Silver impregnated Carbon block filters made in Example-1. The values of the average Silver content of three Carbon block filters for each case, (which was the average of three replicate analyses for each block) is given in Table-1 below.

TABLE 1

| Commercial Carbon block filter | % average Silver content | Example-1 Carbon block filter | % average Silver content |
| --- | --- | --- | --- |
| Block 1 | 0.076 | Block 1 | 0.10 |
| Block 2 | 0.071 | Block 2 | 0.10 |
| Block 3 | 0.081 | Block 3 | 0.095 |

The data in the table above indicates relatively low variation in average Silver content in the case of Carbon block filter of Example-1 made according to the invention. The comparative Carbon blocks, on the other hand, showed inconsistent Silver content and a higher deviation from the theoretical value, which was 0.1 wt %. From the values, the variation in average Silver content of the block filter of Example-1 and the comparative block filters (and it's deviation from the theoretical Silver content of 0.1 wt %) can be appreciated.

Example-3

Adsorption of Organic Contaminants Present in Water by the Carbon Block Filters According to the Invention For this experiment, a Carbon block filter of Example-1 (which was made according to the invention) was fitted inside a gravity-fed water purification device containing a top and a bottom chamber. The filter was fitted inside the top chamber. The bottom chamber had a provision for outlet of treated water. In this experiment, 1500 liters of water containing 5.4 ppm (parts per million) of a heterocyclic organic contaminant (Triazine) was periodically added to the top chamber of the device. In this way, it was made to pass through the Carbon block filter and the treated water which collected in the bottom chamber was periodically analysed for the content of the heterocyclic organic contaminant (Triazine) by the standard HPLC (High Performance Liquid Chromatography) method to check for any reduction in its level after passing through the filter. In a comparative example, 1500 liters containing the same level of the above contaminant were passed through another device in which the comparative Carbon block filter (having theoretical value of 0.1% Silver impregnation) was fitted. The amount of the contaminant in the water was determined at regular intervals by collecting the treated water from the outlet. The results are shown in Table-2 below.

TABLE 2

| Comparative block filter/liters of water passed | Concentration of the organic contaminant/ppm | Carbon block filter (of Example-1) according to the invention/liters of water passed | Concentration of the organic contaminant/ppm |
| --- | --- | --- | --- |
| 700 | 0.93 | 700 | 0.50 |
| 1200 | 1.99 | 1200 | 0.93 |
| 1500 | 2.49 | 1500 | 0.98 |
| % Adsorption by the block filter at the end of 1500 liters | 70.64% | % Adsorption by the block filter at the end of 1500 liters | 86.5% |

The data in the above table indicates that the adsorption of the Carbon block filter according to the invention was about 16% higher than comparative block filter.

Example-4

Experiment on Leaching of Silver from the Impregnated Carbon Block Filter According to the Invention In the case of metal impregnated Carbon block filters, it is essential that its impregnated metal stays firmly inside the block and the leach rate into the water being filtered is minimal. For this reason, the extent of leach of the metal is often determined and reported in parts per billion (ppb). In another set of experiments, the leach-rate of Silver from the Carbon block filter (according to the invention) was compared against the comparative block filter. The amount of Silver was determined at regular intervals while 1200 liters of water was passed separately through both the Carbon block filters, which were fitted in separate gravity-fed water purification devices as in Example-3. The Silver content was determined by a method well-known to a person skilled in the art. The results are shown in Table-3 below.

TABLE 3

| Comparative block filter/liters of water passed | Silver content in the output water/ppb | Carbon block filter (of Example-1) according to the invention/liters of water passed | Silver content in the output water/ppb |
| --- | --- | --- | --- |
| 10 | 17 | 10 | 20 |
| 20 | 25 | 20 | 10 |
| 30 | 22 | 30 | <10 |
| 40 | 23 | 40 | <10 |
| 50 | 29 | 50 | <10 |
| 60 | 30 | 60 | <10 |
| 70 | 33 | 70 | <10 |
| 80 | 21 | 80 | <10 |
| 90 | 26 | 90 | <10 |
| 100 | 32 | 100 | <10 |
| 1200 | 29 | 1200 | <10 |

The data in the above table indicates substantially lower leach of Silver from the Carbon blocks according to the invention, when compared to the comparative Carbon blocks at same (theoretical) Silver loading during and after the passage of 1200 liters of water.

Example-5

Preparation of Carbon Block Filters with 0.5% and 1% Copper; 0.5% and 1% Zinc; and a Combination of 0.67% Copper and 0.33% Zinc—Study of Metal Leach-Rate of the Block Filter Copper impregnated Carbon block filters, Zinc impregnated Carbon block filters and block filters impregnated with a mixture of Copper and Zinc metals were prepared by a method similar to Example-1. The details of the individual processes are as follows:

To make a Carbon block filter with 0.5% Cooper impregnation; 100 ml of 3.0 wt % aqueous solution of Copper nitrate (ml) was prepared and to that solution 1.4 g Ammonium hydroxide (100%) was added. The solution was mixed to obtain a clear solution. To this clear solution, 150 g activated Carbon particles (particle size in the range of 250μ-500μ) were added and the contents were mixed in a ribbon blender as described in Example-1 to get a aqueous mix. Further, 25 g Ultra High Molecular Weight Polyethylene with MFR~0 g/10 minutes, and having bulk density of 0.45 g/cm$^3$ from Asahi Corporation (Japan) was added while mixing, to form a mixture. This mixture was added to a mould and cured at high temperature to form a block filter in a manner similar to that described in Example-1.

For 1 wt % Copper impregnation, 6.0 g Copper nitrate was dissolved in 100 ml water and 2.8 g Ammonium hydroxide (100%) was added. Rest of the procedure was same as described above for 0.5 wt % Copper impregnation.

In a similar manner, 0.5 wt % Zinc impregnated Carbon block filters were made by first preparing 100 ml of 3.75 wt % aqueous solution of Zinc nitrate. To this solution, 1.1 g Ammonium hydroxide (100%) was added. Rest of the procedure was same as described above for 0.5 wt % Copper impregnation.

For 1 wt % Zinc impregnation, 100 ml aqueous solution containing 7.5% Zinc Sulphate was prepared and to this solution, 2.2 g Ammonium hydroxide (100%) was added. Rest of the procedure was same as described above for 0.5 wt % Copper impregnation.

Cu and Zn Mixed Metal Impregnation (0.67 wt % Copper and 0.33 wt % Zinc Impregnation)

The process for making Carbon block filters impregnated with Copper and Zinc included the steps of mixing the activated Carbon particles with an aqueous solution of soluble salts of Copper/Zinc (preferably nitrate) in the presence of Ammonium hydroxide, followed by mixing of polyethylene binder, mould filling, compaction and curing in oven. For this process, 100 ml aqueous solution of 4.2 wt % Copper nitrate was first prepared. To this solution, 2.5 g of Zinc nitrate was added and mixed till both the salts dissolved completely. To this 100 ml solution, 2.7 g Ammonium hydroxide (100%) was added. To this aqueous solution, 150 g activated Carbon particles were added and mixed to get an aqueous mix in a ribbon blender as described in Example-1 above. To this aqueous mix, 25 g binder was added to get a mixture. The mixture was then filled in a mould and compressed at 10 kg pressure and cured in an oven at 250° C. for 3.5 hours. The mould was then cooled to ambient temperature and the block was de-moulded from the mould.

The filter blocks prepared in the above examples were fitted inside separate gravity-fed water purification devices, and water was allowed to pass through the filters. The amount of the leached metal in the water, which had passed through the filter blocks, was determined at regular intervals by collecting the treated water from the outlet. The amount of metals was analysed by well known methods. The results are presented in Table-4 below, in terms of parts per million (ppm) of Copper or Zinc leached out of the blocks.

The data in the above table indicates that even after the passage of 100 liters water through the blocks, the leach-rate was significantly low and well-within the acceptable levels.

It will be appreciated that the illustrated examples provide a process for preparing a moulded Carbon block filter impregnated with a metal selected from Silver, Copper or Zinc, with relatively low level of variance in metal content across the blocks and where the leach-rate of metal from the block is relatively low.

It should be understood that the specific forms of the invention herein illustrated and described are intended to be representative only as certain changes may be made therein without departing from the clear teachings of the disclosure.

Although the invention has been described with reference to specific embodiments, it will be appreciated by those skilled in the art that the invention may be embodied in many other forms.

What is claimed is:

1. A process comprising:
    (i) adding activated carbon particles to an aqueous solution of: (i) a salt of silver, zinc or copper and (ii) ammonium hydroxide to form an aqueous mix;
    (ii) mixing the aqueous mix with a binder having a Melt Flow Rate less than 1 g/10 minutes to form a mixture;
    (iii) adding the mixture to a mould;
    (iv) heating the mould to a temperature in the range of 150° C. to 350° C. for 90 minutes to 300 minutes and applying sufficient pressure to form a carbon block filter having uniform metal impregnation;
    wherein the uniform metal impregnation of the carbon block filter is measured as a deviation of an average metal content of the carbon block filter from a theoretical metal content of the carbon block filter of 5% or less; and,
    (v) removing the carbon block filter from the mould.

2. The process of claim 1, wherein the salt is at least one of silver nitrate, zinc nitrate and copper nitrate.

3. The process of claim 2, wherein of the salt is silver nitrate and a concentration of the silver nitrate in the aqueous solution is 0.01 to 10 wt % of the aqueous solution.

4. The process of claim 1, wherein a concentration of ammonium hydroxide in the aqueous solution is 0.1 to 10 wt % of the aqueous solution.

5. The process of claim 1, wherein a ratio of the ammonium hydroxide to the salt of the silver, zinc or copper is 1:2 to 1:10.

6. The process of claim 1, wherein a ratio of the activated carbon particles to the aqueous solution of the salt is 1:0.4 to 1:2.

TABLE 4

| Liters of water passed | Block filter with 0.5 wt % Copper (Cu) Amount of Copper in water, ppm | Block filter with 1.0 wt % Copper Amount of Copper in water, ppm | Block filter with 0.5 wt % Zinc (Zn) Amount of Zinc in water, ppm | Block filter with 1.0 wt % Zinc Amount of Zinc in water, ppm | Block filter with 0.67 wt % Cu + 0.33 wt % Zn Amount of Copper in water, ppm | Block filter with 0.67 wt % Cu + 0.33 wt % Zn Amount of Zinc in water, ppm |
|---|---|---|---|---|---|---|
| 10 | 0.396 | 0.900 | 0.100 | 0.208 | 0.900 | 0.900 |
| 20 | 0.386 | 0.800 | 0.111 | 0.600 | 0.770 | 0.600 |
| 30 | 0.346 | 0.800 | 0.184 | 0.700 | 0.790 | 1.000 |
| 40 | 0.250 | 0.800 | 0.335 | 1.700 | 0.660 | 0.880 |
| 50 | 0.521 | 1.00 | 0.455 | 1.500 | 0.500 | 0.930 |
| 60 | 0.591 | 1.01 | 0.543 | 1.170 | 0.530 | 1.190 |
| 70 | 0.608 | 0.831 | 0.559 | 1.310 | 0.400 | 0.810 |
| 80 | 0.517 | 0.770 | 0.500 | 1.470 | 0.350 | 0.770 |
| 90 | 0.520 | 0.940 | 0.450 | 1.530 | 0.450 | 0.630 |
| 100 | 0.460 | 1.100 | 0.350 | 1.330 | 0.510 | 0.650 |

7. The process of claim 1, wherein the average metal content of the carbon block filter is equal to the theoretical metal content of the carbon block filter.

* * * * *